US006283226B1

(12) United States Patent
Chen

(10) Patent No.: US 6,283,226 B1
(45) Date of Patent: Sep. 4, 2001

(54) CLUTCH-BUFFER ASSEMBLY FOR POWER WRENCH

(76) Inventor: Kenneth Chen, 6F,No.969,Sec.2, Jung Shan Rd., Tai Shan Shiang, Taipei County (TW)

( * ) Notice: Subject to any disclaimer, the term of this patent is extended or adjusted under 35 U.S.C. 154(b) by 0 days.

(21) Appl. No.: 09/722,553

(22) Filed: Nov. 28, 2000

(51) Int. Cl.$^7$ .................................................. B23Q 5/00
(52) U.S. Cl. ......................... 173/93.5; 173/93; 173/176
(58) Field of Search ........................ 173/93.5, 93, 176, 173/216, 179, 93.6; 81/54

(56) References Cited

U.S. PATENT DOCUMENTS

| | | | | |
|---|---|---|---|---|
| 5,379,851 | * | 1/1995 | Huang | 173/179 |
| 5,435,398 | * | 7/1995 | Juan | 173/176 |
| 5,740,892 | * | 4/1998 | Huang | 173/93 |
| 5,887,666 | * | 3/1999 | Chen et al. | 173/93.5 |
| 5,915,484 | * | 6/1999 | Hsieh | 173/176 |
| 5,941,319 | * | 8/1999 | Juan | 173/93.5 |
| 6,119,794 | * | 9/2000 | Chen | 173/93.5 |
| 6,186,247 | * | 2/2001 | Wang | 173/93 |

* cited by examiner

*Primary Examiner*—Scott A. Smith
(74) *Attorney, Agent, or Firm*—Rosenberg, Klein & Lee

(57) ABSTRACT

A clutch-buffer assembly for power wrench comprises a driven wheel having an outwardly extended positioning tube disposed at a power-input end thereof. A retaining spring, a retaining disc, a driven gear, an anchor ring, and a reversible motor are collared onto the positioning tube sequentially, wherein the retaining disc is limited to move back and forth along the positioning tube without rotation; a pair of protruding teeth and reception cavities in respective contact faces of the retaining disc and the driven gear; and the reversible motor is used to drive the driven gear. When the driven wheel rotates at a higher speed, the retaining disc can be detached from the driven gear for control of the power consumption to lessen the imposed load in order not to blow the fuse, by this way the power wrench can generate larger output torque. Also, the retaining disc can be detached from the driven gear to alleviate the backlash caused by recoil of the driven wheel when impacting.

4 Claims, 3 Drawing Sheets

CLUTCH-BUFFER ASSEMBLY FOR POWER WRENCH

BACKGROUND OF THE INVENTION

1. Field of the Invention

This invention relates generally to a power wrench, more particularly, it relates to a clutch-buffer assembly for power wrench in a low-cost simple structure to be operated easily with high efficiency and low power consumption.

2. Description of the Prior Art

In a conventional clutch device for power wrench, such as a disclosed Taiwan patent No. 109,948, the U.S. Pat. Nos. 5,740,892 and 5,412,546, the centrifugal force is applied for locking or unlocking a work piece, however, any of them is found imperfect in one way or another.

Besides, in a Taiwan patent No. 34,448, a vehicle's exhaust gas is taken as the power source in consideration of operational convenience, nonetheless, some common defects and security problems must be pondered deliberately.

Furthermore, a previously submitted application No. 089,200,156 of the present inventor sought for local patent is designed to take advantage of the vehicle's battery as power source for the sake of promoting convenience, simplifying structure, and cutting cost.

In whichever the abovesaid power wrench, the driving force directly or indirectly transmitted from a motor must exceed a least level in order to load or unload a work piece, and accordingly, a heavy-duty motor will be required for driving a relatively heavier load which seems a dilemma between the desired performance and the motor cost.

SUMMARY OF THE INVENTION

The primary object of this invention is to provide a clutch-buffer assembly for power wrench, wherein the power is transmitted to a driven article through a buffer structure so as to limit power consumption and keep smooth operation of the motor.

Another object of this invention is to provide a clutch-buffer assembly for power wrench, which is designed to offer a higher torque output by using vehicle's power for driving heavier loads with least power consumption and for convenience.

Yet another object of this invention is to provide a clutch-buffer assembly for power wrench, which can alleviate backlash caused by impacting for prolonging lifetime.

One more object of this invention is to provide a clutch-buffer assembly for power wrench applicable to a variety of work pieces in different measurements by a slight adjustment.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
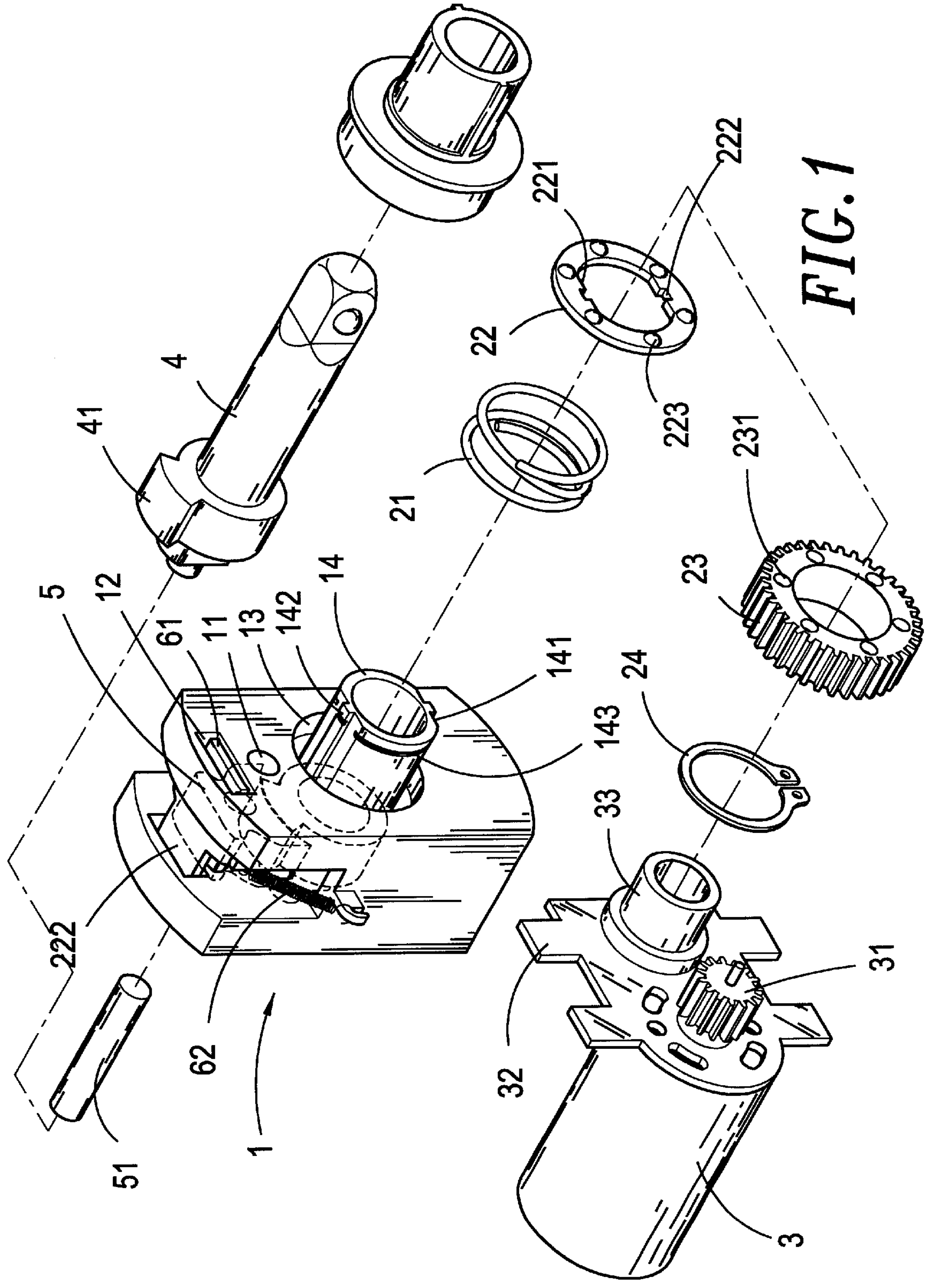
FIG. 1 is an exploded view in three dimensions showing a clutch-buffer assembly for power wrench of this invention.
Figure 2:
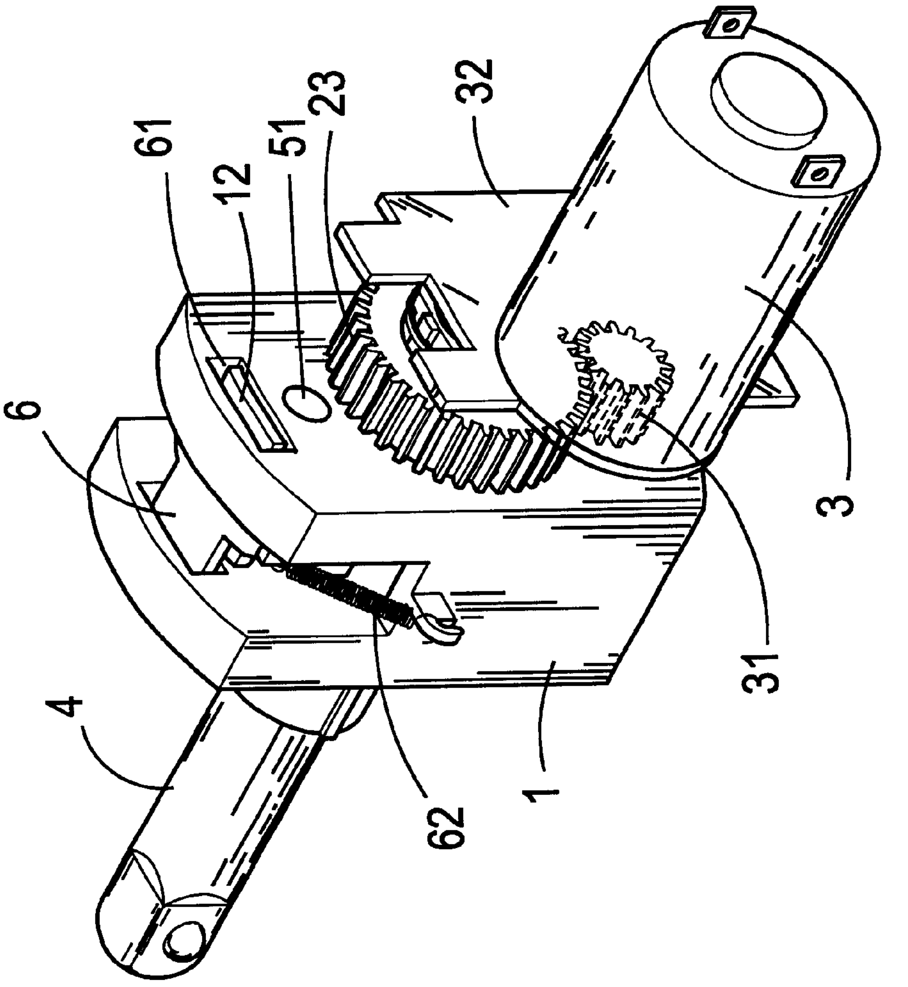
FIG. 2 is an assembled view in three dimensions showing the clutch-buffer assembly for power wrench of this invention.

A clutch-buffer assembly for power wrench of this invention shown in FIGS. 1 and 2 mainly comprises a driven wheel 1, a retaining spring 21, a retaining disc 22, a driven gear 23, an anchor ring 24, and a reversible motor 3.

The driven wheel 1 is a hollow seat provided with a transmission shaft 4 at its power-output end, wherein a reception block 41 is arranged at one end of the transmission shaft 4 to be buried in the driven wheel 1; a hammer 5 is disposed above the reception block 41 and fixed with a positioning pin 51 penetrating a circular hole 11 in the respective walls of the driven wheel 1; and a clutch plate 6 having a stop piece 61 trapped in a wall opening 12 both in the front and the rear end of the driven wheel 1 is disposed above the hammer 5 and hooked at the driven wheel 1 by a pair of tension springs 62.

On the other hand, a receptacle 13 is formed at a power-input end of the driven wheel 1, wherein the receptacle 13 is extended outwardly to form a positioning tube 14 whereon the retaining spring 21, the retaining disc 22, the driven gear 23, and the anchor ring 24 are collared sequentially one after another; one end of the retaining spring 21 props against the receptacle 13 and the other end against the retaining disc 22; a pair of opposite limit edges 221, 141 is formed in respective contact faces of the retaining disc 22 and the positioning tube 14 at corresponding positions, wherein a guide track 142 and a guide recess 222 are formed in each limit edge 141, 221 respectively; a plurality of protruding teeth 223 and reception cavities 231 are disposed in respective contact faces of the retaining disc 22 and the driven gear 23; and the anchor ring 24 is a C-fastener while an corresponding annular retaining groove 143 is circularly formed on the positioning tube 14.

Moreover, a transmission gear 31 and a positioning wall 32 are provided to the reversible motor 3 at its output end or its front end respectively, wherein a hollow shaft 33 is disposed on the positioning wall 32 and fixedly jointed with the positioning tube 14 to have the transmission gear 31 meshed with the driven gear 23 to enable the reversible motor 3 to transmit power to the driven wheel 1.

Figure 3A:
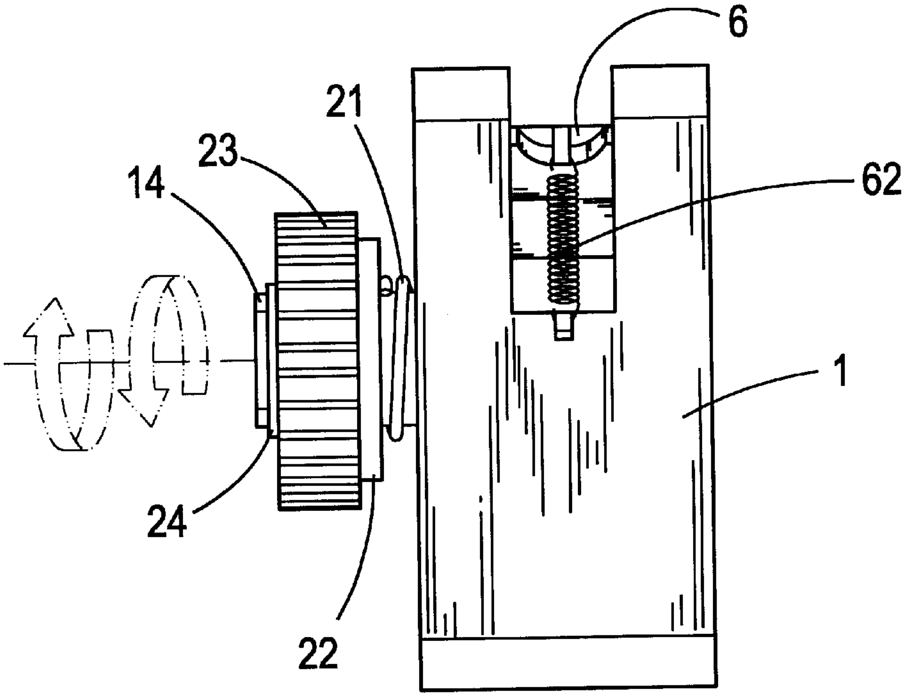
FIG. 3(A) shows a working example of the clutch-buffer assembly for power wrench of this invention.
Figure 3B:
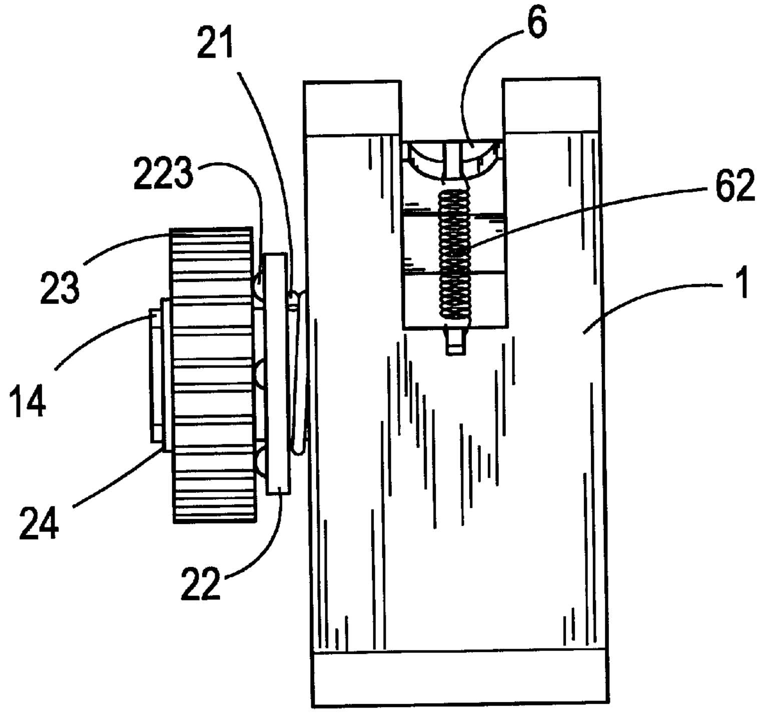
FIG. 3(B) shows another working example of the clutch-buffer assembly for power wrench of this invention.

Referring to FIGS. 3(A) and 3(B), when the reversible motor 3 is started, power is transmitted to the driven wheel 1 through the transmission gear 31 and the driven gear 23 (shown in FIG. 3(A)). However, because of counterweights, the driven wheel 1 is driven to rotate from the normal static state and accelerated if the dynamic power of the reversible motor 3 is sufficiently large.

In the case of a vehicle, as the cigarette lighter jack with a rated current of 15 amp is the only power source available, the resistant force of the retaining spring is predetermined basing on the DC current. When the start current of the reversible motor 3 is smaller than 15 amp and the transmission torque is greater than the resistant force of the retaining spring 21, the plurality of protruding teeth 223 of the retaining disc 22 is compressed to displace out of the reception cavities 231 of the driven gear 23 to detach the driven gear 23 from the retaining disc 22 (shown in FIG. 3(B)) so that the driven wheel 1 will rotate no more with the driven gear 23 synchronously. Then the retaining spring 21 is restored to push the retaining disc 22 back to its original position to engage with the driven gear 23 again. By doing so cyclically—engagement and disengagement between the driven gear 23 and the retaining disc 22 repeatedly—the driven wheel 1 is driven and accelerated to reach a rated rotation speed so that the clutch plate 6 in the driven wheel 1 spreads outwardly to release the hammer 5 because of the centrifugal force. Now, the released hammer 5 can rotate freely pivoting the positioning pin 51 and basing on the rotation direction of the driven wheel 1 to impact and drive the transmission shaft 4 to rotate synchronously with the driven wheel 1 for loading or unloading a work piece. When the output force isn't large enough, the driven wheel 1 would stop rotation and the centrifugal force disappears, and the clutch plate 6 is reset by the tension springs 62 and the hammer 5 is restored. Then, the reversible motor 3 is started again to drive the hammer 5 to impact the transmission shaft 4 to rotate. In such a repeated way of speeding up and impacting to boost pressure, a work piece is locked or unlocked.

When the hammer 5 impacts the reception block 41, the powerful recoil force may cause the driven wheel 1 together with the driven gear 23 to impact backwards, hence, a clutch function is designed in this invention to detach the driven gear 23 from the driven wheel 1 to obtain an anti-shock effect. According to the above described, the merits of this invention may be summarized in the following:

1. As the reversible motor is to drive the driven wheel indirectly through the driven gear, therefore, a smaller working current from a vehicle power can serve well.
2. When the rotation speed of the driven wheel is reduced because of load, the driven gear can be detached from the driven wheel to keep the reversible motor rotating in a normal speed to avoid being damaged.
3. The output torque can be controlled easily by adjusting the specifications of the retaining spring and the counterweights of the driven wheel.

In the above described, at least one preferred embodiment has been elucidated with reference to the drawings annexed, and it is apparent that numerous variations or modifications may be made without departing from the true spirit and scope thereof, as set forth in the claims below.

What is claimed is:

1. A clutch-buffer assembly for power wrench, comprising:

a driven wheel being a hollow seat having a transmission shaft penetratingly disposed at an power-output end thereof, wherein a reception block provided to the transmission shaft is protrusively arranged in the driven wheel; a hammer is located above the reception block; and a clutch plate is disposed above the hammer to spread outwardly by dint of centrifugal force to enable the hammer to impact the reception block and drive the transmission shaft to rotate synchronously;

a reversible motor having a transmission gear disposed at an output end thereof;

wherein the clutch-buffer assembly is characterized in:

an outwardly extended positioning tube fitted at a power-input end of the driven wheel; a retaining spring, a retaining disc, a driven gear, and an anchor ring sequentially collared on an outside wall of the positioning tube; one end of the retaining spring propping against the driven wheel and the other against the retaining disc; a pair of limit edges formed in respective contact faces of the retaining disc and the positioning tube at corresponding positions; a plurality of protruding teeth and reception cavities disposed in respective contact faces of the retaining disc and the driven gear; and the anchor ring being locked on the positioning tube.

2. The clutch-buffer assembly for power wrench according to claim 1, wherein the pair of limit edges is formed in two opposite faces of the positioning tube and the retaining disc; and a guide track and a guide recess are provided to each limit edge of the positioning tube and the retaining disc respectively so as to ensure the retaining disc to move back and forth along the positioning tube without rotation.

3. The clutch-buffer assembly for power wrench according to claim 1, wherein the protruding teeth of the retaining disc and the reception cavities of the driven gear contacted with each other can be separated to enable the driven gear to rotate without tangling with the retaining disc.

4. The clutch-buffer assembly for power wrench according to claim 1, wherein the anchor ring is a C-fastener to be fixedly buckled to the positioning tube having an annular retaining groove.

* * * * *